United States Patent [19]
Stephens

[11] Patent Number: 5,791,378
[45] Date of Patent: *Aug. 11, 1998

[54] METHOD FOR GROUTING PIPE LINERS

[76] Inventor: Patrick J. Stephens, 1276 Chuckanut Dr., Bellingham, Wash. 98225

[*] Notice: The term of this patent shall not extend beyond the expiration date of Pat. No. 5,241,993.

[21] Appl. No.: 495,346

[22] Filed: Jun. 27, 1995

Related U.S. Application Data

[63] Continuation-in-part of Ser. No. 111,392, Aug. 25, 1993, Pat. No. 5,427,154.

[51] Int. Cl.⁶ .................................................... F16L 55/18
[52] U.S. Cl. ........................... 138/98; 138/97; 264/269
[58] Field of Search ............................ 138/97, 98, 105, 138/140; 264/36, 269; 156/94, 294; 405/150.1, 150.2, 154, 155, 156; 106/625, 672, 677, 678, 681, 682

[56] References Cited

U.S. PATENT DOCUMENTS

| | | | |
|---|---|---|---|
| 3,758,319 | 9/1973 | Ergene | 106/675 |
| 3,774,403 | 11/1973 | Cushing | 138/105 |
| 3,867,159 | 2/1975 | Ergene | 106/675 |
| 3,979,217 | 9/1976 | Sutton | 106/675 |
| 4,170,248 | 10/1979 | Bennett et al. | 138/97 |
| 4,583,784 | 4/1986 | Uhri | |
| 4,678,370 | 7/1987 | Allen | 138/97 |
| 4,786,211 | 11/1988 | Leutner et al. | |
| 4,867,203 | 9/1989 | Jan De Putter | 138/98 |
| 4,938,627 | 7/1990 | Lee | 405/154 |
| 4,948,298 | 8/1990 | Hayden | 138/97 |
| 4,954,016 | 9/1990 | Jurard | |
| 4,954,916 | 9/1990 | Storgard | 405/154 |
| 4,956,932 | 9/1990 | Hahn et al. | 138/97 |
| 5,063,967 | 11/1991 | Stephens | 138/97 |
| 5,096,616 | 3/1992 | Kittle | |
| 5,119,839 | 6/1992 | Chao | 521/83 |
| 5,141,363 | 8/1992 | Stephens | 405/150.2 |
| 5,190,705 | 3/1993 | Corazza | 138/97 |

Primary Examiner—Patrick F. Brinson
Attorney, Agent, or Firm—Todd N. Hathaway

[57] ABSTRACT

A pumpable cement grout and method for use thereof for grouting liner pipes. The pumpable cement grout is a mixture of a hydraulic cement, water in an amount sufficient so that the water-to-cement ratio of the grout is from about 0.60 to about 1.00 by weight, and pregenerated aqueous foam in an amount sufficient to adjust the wet density of the grout to a value of from about 48 to about 72 pounds per cubic foot. The pressure at which the grout is injected into the cavity is maintained at or below a predetermined maximum pressure, so as to avoid collapsing the liner pipe.

22 Claims, 2 Drawing Sheets

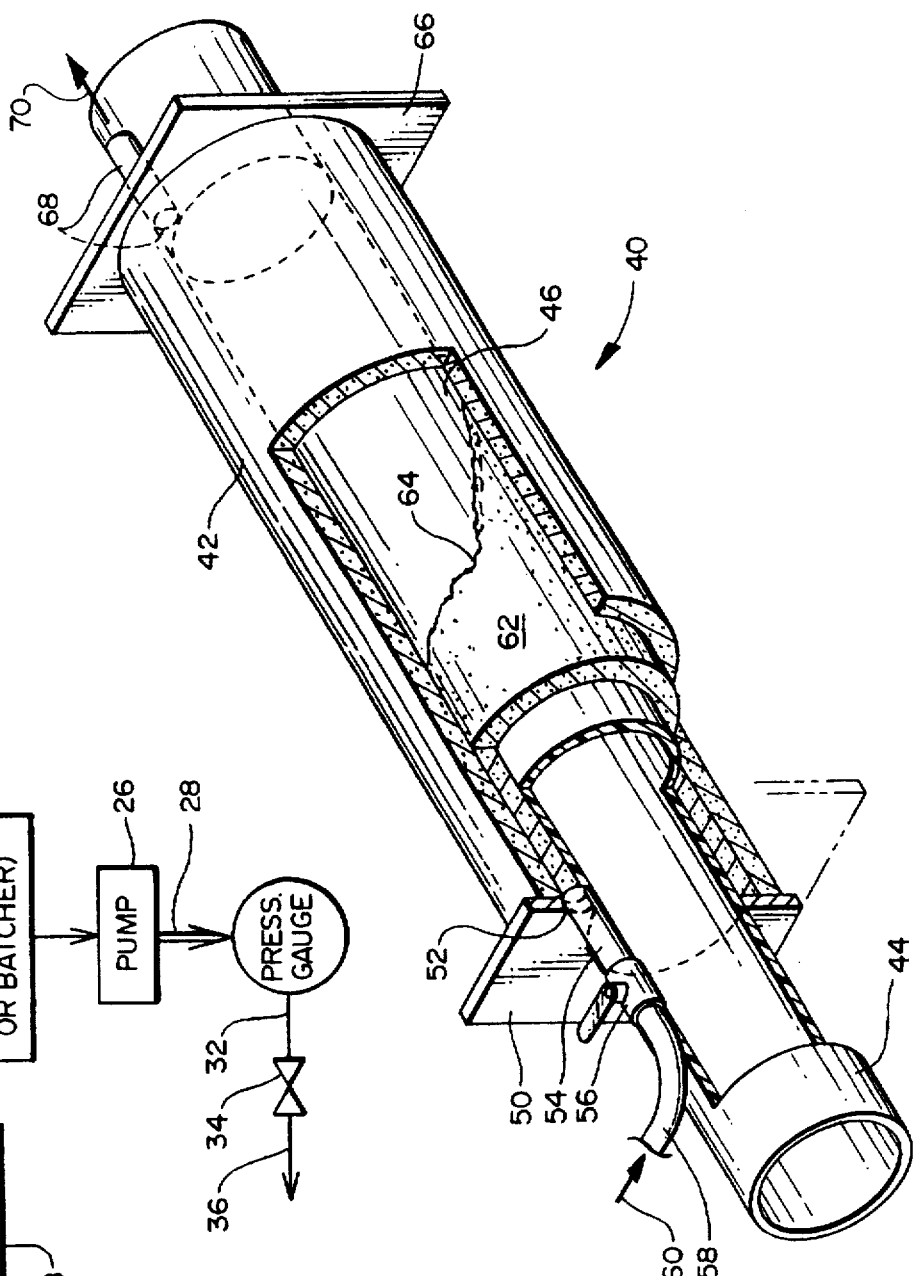

METHOD FOR GROUTING PIPE LINERS

This is a continuation-in-part of application(s) Ser. No. 0 8/111,392 filed on Aug. 25, 1993 now U.S. Pat. No. 5,427,154.

BACKGROUND OF THE INVENTION

1. Field of the Invention

The present invention relates generally to cement grouts and methods for use of the same. More particularly, the present invention relates to a pumpable cement grout for grouting of annular cavities.

2. Background Art

Much of the infrastructure of modern society is in need of repair or upgrading, or, at the least is in need of means for reducing the frequency of such repairs. For example, it is well known that a great many sewer systems throughout the United States and elsewhere are greatly in need of frequent repair.

One relatively new and effective technique that has been used for upgrading sewer systems involves relining existing concrete sewer lines with plastic liner pipe, such as high density polyethylene (HDPE) pipe. The plastic liner is inserted into the sewer line, and is pulled or jacked longitudinally through the sewer line into place. In order to fit within the concrete sewer line, the plastic liner pipe must have an outside diameter which is smaller than the inside diameter of the concrete sewer pipe, so as to provide clearance between the two. An annular cavity is thus formed between the pipe and liner. However, it is undesirable for the liner pipe to be very much smaller in diameter than the sewer pipe, lest the capacity of the upgraded sewer system be adversely affected. Accordingly, plastic liner pipes are typically installed so that there is adequate, but minimal clearance between the outside of the liner pipe and the interior surface of the sewer pipe; in a typical installation, the radial clearance (i.e. the radial extent of the annular gap) may range from about 3 inches to less than 1 inch.

Once the plastic liner pipe has been pulled or jacked into place, it is usually desirable to fill the annular space between the pipe and liner with grout to protect the liner from future damage. The potential for such damage may exist, for example, when the old concrete pipe is badly deteriorated and there is a danger that portions of the wall of the pipe may fail. A material which has been found suitable for such protective grouting is concrete grout which, in conjunction with the inexpensive plastic liner pipe, provides the potential for old sewers to be rehabilitated with minimal excavation and cost. However, the inside diameters of concrete sewer pipes typically range in size from about 60 inches down to 15 inches or less, and so direct access to the interior of the sewer line by personnel and construction equipment is usually difficult or impossible; this precludes the possibility of grouting of the pipe liner by means of the conventional cement grouting techniques which are used for backfilling large tunnels and similar structures, which typically involve boring holes through the wall of the tunnel at a multiplicity of points along the length of the tunnel, and then injecting cement grout through the holes and into each local area of the cavity about the tunnel.

Because of this inability to apply proven, conventional techniques, grouting of plastic sewer liners has been attempted by injecting a cement grout into the annular cavity at a first point along the pipe so that the grout flows longitudinally through the cavity towards a second point along the pipe. However, a very serious problem has been encountered when attempting to use this technique because the plastic liner pipe itself is typically unable to resist the significant external pressures which are exerted by the injected concrete grout. As noted above, the space between the plastic liner pipe and the existing sewer pipe is typically small; hence, it is typically very difficult to maintain a low grout pressure when pumping the grout longitudinally through the annular cavity. Unfortunately, the plastic liner pipe can easily collapse under even relatively low pressures, some pipes being unable to withstand external pressures as low as 3 pounds per square inch (psi). For example, a plastic liner pipe which is commonly used for lining sewer pipe is high density polyethylene (HDPE) pipe having a wall thickness of SDR 32.5 (where SDR is the ratio of outside diameter-to-wall thickness). HDPE pipe having a wall thickness of SDR 32.5, while able to contain significant internal pressures, has a tendency to collapse within one day if subjected to an external pressure in excess of 4 psi. Another, less commonly used size of HDPE pipe has a wall thickness of SDR 26, and tends to collapse when subjected to an external pressure in excess of 8 psi. Such external pressure maximums can easily be exceeded when attempting the longitudinal injection techniques described above using conventional cement grouts. The conventional cement grouts generally exhibit fairly high viscosities, and relatively high injection pressures are thus required to force the grouts along the annular cavity. Furthermore, as the grout moves through the annular cavity, the grout tends to hydrate (i.e. bind or set up), particularly if the concrete sewer pipe and/or plastic liner are dry, thus compounding the difficulty of maintaining a low grout injection pressure; also, in many cases the plastic liner may be ribbed or corrugated, and the increased external surface area of this pipe tends to compound the hydration factor, as well as add increased friction.

These problems become critical when long distances are encountered between sequential injection points, in other words, when the individual runs to be grouted between access points are fairly long. This is often the case in conventional city sewers, where the distance between access points provided by manholes is often on the order of 300–500 feet or more. In some such cases, the contractors performing such grout work (using conventional cement grouts), have resorted to the expedient of drilling access holes vertically through the pavement and soil overlying the sewer pipe so as to provide additional grout injection points, which is obviously a costly and time-consuming makeshift approach. But, if the plastic liner collapses during the grout injection, the consequences may be catastrophic for the job. Not only is the flow of sewer water through the sewer line blocked by such a collapse, which may cause an overflow, but it may also be necessary to excavate and replace the entire section of sewer line in which the liner is collapsed, at great expense.

As was noted above, the problem of high grout pressures often develops in installations where the annular clearance between the pipe and liner is relatively tight, e.g., in a range of about 3 inches or less, and also in small-moderate diameter installations. However, similar problems can sometimes develop in large or very large diameter installations, and also where there are relatively large annular clearances. For example, synthetic pipe liners are available in the 10 foot diameter range, and 30 foot plus diameter water/sewer lines are in existence. As a general rule, however,the larger the diameter of the liner, the lower the external pressures which it can withstand. Moreover, when grouting very large diameter installations, fluid loss from the grout can reach very high levels owing to the large surface areas involved.

Accordingly, even though the annular clearance may be very great, the development of excessive grout pressures and the resultant collapse of the liner can be a very real problem in such installations, even when using straight-sided liner pipe.

An analogous problem can develop when using certain liner systems which have buttresses or flanges which extend around the outside of the synthetic liner pipe so as to support the liner within the original conduit. An example of a liner system of this type is that which is available under the trademark "T-LOCK" from the Danby Company. A simplified example of a liner 100 of this general type is shown in FIG. 4. As can be seen, this comprises the liner pipe 102 having outwardly extending flanges 104 about its outer surface, which extend to and engage the inner wall of the conduit 106. Each of the flanges 104 extends around the perimeter of the liner pipe, so that a series of annular voids 108 are formed between the liner and the conduit.

The voids 108 must be filled with grout 110 to complete the installation, as is shown in FIG. 4, with injection ports 112 being provided in the liner pipe 102 for this purpose. As the grout flows in a generally circumferential direction through the long annular chambers or channels 108, hydration and fluid loss problems may develop. Also, the actual weight of the grout itself becomes an important factor: As can be seen in FIG. 5, when using prior art grouts to fill the cavities 108, the weight of the grout 110 increases the external pressure on the lower sides and bottom of the liner pipe 102. As a result, these areas tend to collapse inwardly, forming large, inwardly extending blisters or "puckers" 114. If substantial, such inward collapse of the liner pipe can ruin the installation.

Although the particular type of liner system which is shown in FIGS. 4–5 is a notable example of this problem, owing both to the injection pressures which develop in the annular cavities and the relative sensitivity of the particular liner pipe to external pressures, it will be understood that this same kind of problem can in some cases develop when using more conventional, straight-sided liner pipes, particularly when quite large conduits/liners are involved.

Accordingly, there exists a need for a grout material for grouting plastic sewer liners and the like, and a method for the use thereof, which is both effective and inexpensive, yet which reduces the possibility of collapse of the plastic liner pipe during grouting of the liner in the sewer line, particularly when using a ribbed or corrugated liner. Furthermore, there exists a need for such a grout material and method for use thereof which employs a fluid yet lightweight grout material which will reduce or eliminate the problem of the weight of the grout itself causing excessive external pressures on the lower and bottom portions of liner pipes.

SUMMARY OF THE INVENTION

The present invention has solved the problems cited above, and is a method for lining a conduit. Broadly, the method comprises the steps of: (a) placing a liner in the conduit so that at least one cavity is formed intermediate the conduit and the liner, an interior of the liner being maintained substantially unpressurized, and the liner having a tendency to collapse if subjected to an external pressure in excess of a predetermined maximum pressure, (b) forming a pumpable cement grout, the grout comprising hydraulic cement, water in an amount sufficient so that the water-to-cement ratio of the grout is from about 0.60 to about 1.00 by weight, and pre-generated aqueous foam in an amount sufficient to adjust the wet density of the grout to a value of from about 48 to about 72 pounds per cubic foot, (c) pumping the cement grout into the cavity under positive pressure so that the grout fills the cavity by flowing in a direction generally along an axis thereof, and (d) maintaining the positive pressure under which the grout is pumped into the cavity between the conduit and liner at about equal to or less than the predetermined maximum pressure.

The step of forming the pumpable cement grout may further comprise the steps of determining the density of the liner, and mixing the pre-generated aqueous foam into the grout in an amount sufficient to adjust the density of the grout to a value substantially equal to or less than that of the liner, so as to avoid the liner floating on the grout to the top of the interior of the conduit.

The method may further comprise the step of directing a flow of fluid, such as water or sewage, through the liner, and the step of determining the density of the liner may comprise determining the density of the liner carrying the flow of the fluid. The flow of fluid may be backed up into the liner, so as to increase the density of the liner and to permit the density of the grout to be increased while still remaining equal to or less than that of the liner.

The method is applicable to both small diameter (60 inch or less) and large diameter (greater than 60 inch) conduits/liners. The grout may be flowed generally in the direction of the longitudinal axis of the liner, or may be flowed in a generally circumferential direction, depending upon the orientation of the cavities.

These and other features of the present invention will become apparent from the following detailed description.

BRIEF DESCRIPTION OF THE DRAWINGS

FIG. 1 is a block diagram representation of apparatus for generating the pumpable cement grout of the present invention;

FIG. 2 is a perspective view of a length of concrete sewer pipe having a plastic liner pipe installed therein and being grouted in accordance with the present invention;

DETAILED DESCRIPTION

Figure 3:
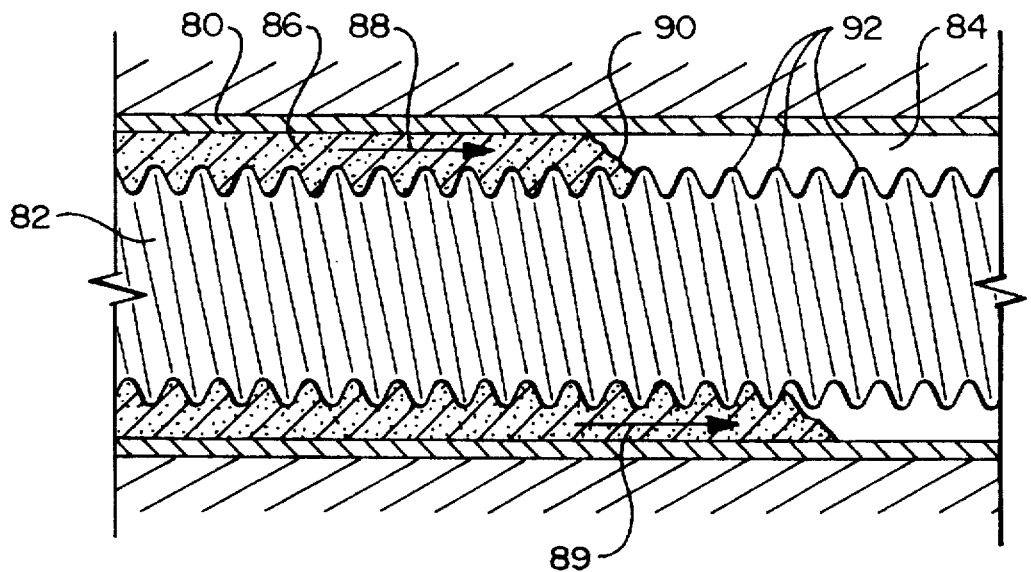
FIG. 3 is a longitudinal cross-sectional view of a length of concrete pipe having a spirally corrugated plastic liner pipe installed therein and being grouted in accordance with the present invention.

FIG. 1 shows a block diagram of an apparatus 10 for producing the lightweight pumpable cement grout of the present invention. Grout generating apparatus 10 comprises a slurry mixer 12, which may be, for example, a drum-truck or a conventional cement mix batcher. Slurry mixer 12 receives hydraulic cement 14 and water 16 for mixing. Cement 14 may be any suitable hydraulic cement which undergoes hydration in contact with water, and is preferably conventional portland cement. In terms of weight-per-yard, cement 14 is added to slurry mixer 12 at a rate of from about 600 pounds to about 1100 pounds per cubic yard of produced grout.

Portland cements are hydraulic cements composed primarily of hydraulic calcium silicates, and are well known to those skilled in the art; during hydration, the cement combines with water to form a stone-like mass. Hydration begins as soon as the portland cement comes in contact with water. Types I and II cement have been found to be particularly suitable for use in the present invention, and noncorrosive cement compounds should be used if the grout is to be placed in contact with corrodible materials, such as steel. Furthermore, it should be understood that cement 14 will generally be free of mineral aggregates and the like, which would ordinarily increase the density of the resulting cement grout, although such fillers may be desirable in some applications of the present invention. Sand, fly ash, and similar materials may be added in amounts which may be desired for a particular application or job (e.g., on the order of 1,000 lbs./yd.$^3$), provided they do not take the density and weight of the grout into unacceptable ranges. Still other additives which are known to those skilled in the art may be included to enhance various characteristics of the grout mixture.

Water 16 may be any water (e.g., fresh or salt) which is suitable for causing hydration of cement 14. For applications where the resulting grout may be in contact with corrodible components, however, it is preferable that water 16 be free of chloride, sulfate, and other ions which might cause corrosion. Sufficient water 16 is added to cement 14 so that the water-to-cement ratio of the mixture is from about 0.60 to about 1.00 by weight. This water-to-cement ratio is significantly higher than that used in conventional lightweight cellular cement mixes, and this helps the pumpable cement grout of the present invention achieve a desirably low viscosity. For example, roof deck-type mixes (which are used to form lightweight cement roofs) may typically have a water-to-cement ratio of approximately 0.50; this lower water-to-cement ratio is necessary for the cement to set up before the bubble structure dissipates, but it also renders such mixes significantly more viscous than the grout of the present invention, and, consequently, the former would require excessively high pressures to inject into the annular space between the liner and sewer pipe.

Slurry mixer 12 also receives pregenerated aqueous foam from foam generator 18. Foam generator 18 may be any suitable conventional foam generation system, such as those used for the production of cellular concrete, and these are well known to those skilled in the art. Typically, such systems include positive displacement foam generating pumps having rotors for mixing liquid foam solution with air, and an example of such a system is the mechanical foam generation system supplied by Cellufoam Concrete Systems (a division of Patrick Chadwick Incorporated, 110 Pine Glen Road, Toronto, Ontario M4E 1K9) as their Model 620-114-1; other examples include batch-type systems which mix a pressurized foam solution stream with a pressurized air stream in a nozzle or column to produce the foam, and an example of this type of system is the batch-type preformed foam system supplied by The Mearl Corporation (220 West Westfield Avenue, Roselle Park, N.J. 07204) as their Model OT 10-5.

Foam generator 18 receives foam solution 20 from a mixing and storage tank, and this solution is usually a mixture of foam concentrate 22 and water 24. Preferably, foam concentrate 22 and water 24 are mixed in proportions such that foam generator 18 produces a suitable micro cellular foam having a density of about 2.40 pounds per cubic foot, although other relatively light densities of preformed foam may be used as well. Foam concentrate 22 itself is usually a suitable foam-forming surfactant material, such as, for example, an alcohol sulfate diethanolamine salt sold under the trademark "DUPONOL" EP Surfactant by E. I. Du Pont de Nemours and Company, Inc., (1007 Market Street, Wilmington, Del. 19898). Similar suitable materials are available from The Mearl Corporation under the trademark "MEARLCEL 3532 FOAM LIQUID", from Cellufoam Concrete Systems under the trademark "WF304 Foam Concentrate", and from Elastizell Corporation of America (P.O. Box 1462, Ann Arbor, Mich. 48106) under the trademark "Elastizell EF". Another example of foam concentrate which may be suitable for some applications of the present invention is available under the trademark "MEARL GEOFOAM LIQUID" from The Mearl Corporation. It will be noted, however, that some foam concentrates, such as the MEARL GEOFOAM LIQUID™, may contain chloride ions and other corrosive components which may limit their use in applications where the grout is to be placed in contact with steel or other corrodible components. Using the commercially available foam concentrates noted above, it has been found that a foam solution 20 comprising two to five percent by volume foam concentrate generally produces foam having suitable density (i.e., about 2.40 PCF) and stability, as well as suitable micro-bubble characteristics, and foam solution comprising about 2.5% by volume foam concentrate has been found to be particularly suitable for use in the present invention. The proportions of foam concentrate and water in the foam solution may, of course, need to be adjusted to compensate for field conditions or different concentrations of foam concentrate, so as to ensure that suitable preformed foam is generated.

The foam is then blended with the cement slurry in the mixing device 12, and the voluminous and stable microbubble pregenerated aqueous foam provides a multiplicity of air voids about which a subsequent cement matrix may form, thus forming a low density concrete; the foam consequently needs to have sufficient stability to maintain its structure until the cement sets to form the matrix, and the foam generation and the proportioning of the cement slurry are regulated to achieve control of the final strength and density of the grout.

After mixing the pumpable cement grout is drawn from slurry mixer 12 to pump 26, which pressurizes the grout for subsequent injection. Pump 26 discharges the grout through hose line 28 to pressure gauge 30, which permits an operator to check the injection pressure of the grout and adjust pump 26 accordingly. From pressure gauge 30, the grout passes through injection line 32 to valve 34. Valve 34 permits an operator to selectively commence and terminate injection of the grout. When valve 34 is open, the grout is discharged through injection fitting 36, as indicated by the arrow, so that it passes into the void which is to be filled by the grout.

The grout generating equipment described above with reference to FIG. 1 is normally very portable, and can be transported to a typical job site using a pickup truck.

Having described the equipment and materials suitable for generation of the pumpable cement grout of the present invention, attention is now directed to FIG. 2, with reference to which the grouting of an exemplary annular void will be described. FIG. 2 shows generally a lined sewer line 40. Sewer line 40 comprises sewer pipe 42, which may typically be a concrete sewer pipe which is in need of upgrading; as noted above, such concrete sewer pipe may typically range in size from about 15 inches up to about 60 inches in inside diameter, which, while relatively large for a sewer line, still provides inadequate space for personnel and grouting equipment to enter the pipe. A liner pipe 44 is disposed in sewer pipe 42 so that liner pipe 44 provides a replacement conduit for the flow of sewer water which is carried by sewer line 40. Liner pipe 44, as noted above, may typically be a plastic pipe, such as an HDPE liner pipe, which tends to collapse if subjected to an external pressure in excess of a predetermined maximum. As also noted above, such liner pipe is typically placed in and then pulled or jacked through sewer pipe 42; accordingly, the external diameter of liner pipe 44 is smaller than the internal diameter of sewer pipe 42, so that an annular gap or void 46 is formed when liner pipe 44 is installed in sewer pipe 42. In typical applications, the radial extent of annular void 46 may vary from about one to about three inches.

Although the example which is described in this section in order to illustrate the present invention—i.e., a small diameter, limited access conduit and tight annular clearances—is of a kind which is notable for the difficulties which are solved by the present invention, it will be understood that the present invention is applicable to larger diameter and larger clearance installations as well. For example, as was noted above, there are very large installations (e.g., up to 10 feet or greater diameter) in which excessive grout pressures remain a serious problem, in spite of clearances typically much greater than 3 inches, owing to fluid loss, hydration and other factors, as well as the relatively diminished ability of the large diameter liners to withstand significant external pressures. Moreover, even in smaller diameter installation with relatively great clearances (e.g., on the order of one to several feet), the present invention eliminates grouting pressure problems which might otherwise have arisen, particularly when long grouting runs are involved.

A bulkhead or dam 50 is installed at a first access point along sewer line 40 so as to seal the annular gap between sewer pipe 42 and liner pipe 44. As noted above, such access points along a sewer line are typically provided by manholes, which extend downwardly from the surface to the sewer pipe, and these may be spaced along a sewer line at distances of 300 to 500 feet or more. Such access manholes are normally of adequate size so as to permit personnel and equipment to gain access to the end or portion of the sewer line at that point. Dam 50 surrounds liner pipe 44 and abuts against the exposed end of sewer pipe 42, thereby sealing the annular gap between the two. Dam 50 may be a board-like dam, as illustrated in FIG. 2, which may be constructed of wood, plastic, metal, or the like, or it may be a built-up dam of earthen materials, gravel, sand, or the like, if sufficient strength to resist the injection pressure of the grout can be so achieved. Dam 50 is provided with an injection port 52, through which an injection nozzle 54 can be inserted. Accordingly, it will be understood that injection port 52 establishes communication between the surface and the annular cavity 46 between the pipes. It will also be understood that injection nozzle 54 corresponds to injection nozzle 36 shown in the block diagram of FIG. 1.

A valve 56 (which may be manually operable and which corresponds to valve 34 shown in the schematic diagram of FIG. 1) is provided to control the flow of grout from pressure line 58 to nozzle 54, and hence into annular void 46. When valve 56 is in an open position, the grout is supplied under pressure from the grout-generating apparatus through supply line 58 in the direction shown by arrow 60, and is injected into annular cavity 46 through injection nozzle 54. As the grout 62 is injected into the cavity, it flows around liner pipe 44 and longitudinally through sewer pipe 42 so as to fill annular cavity 46. Thus, it will be seen that the leading edge 64 of the grout proceeds longitudinally through the annular cavity, away from the first access point towards a second access point (typically provided by a second access manhole). A second dam 66 may be installed at the second access point, and may have an ejection port 68 therethrough. As the leading edge of the grout proceeds longitudinally within the sewer line, air will be forced out of annular cavity 46. This air escapes through ejection port 68 in the direction shown by arrow 70. When the leading edge 64 of grout 62 reaches second dam 66, grout 62 will begin escaping from ejection port 68, indicating to an observer that grouting of the section of sewer line 40 between the first and second access points has been completed. It will be understood, of course, that it may be desirable under some circumstances to delete the second dam and simply permit the air and grout to escape from the annular gap between the two pipes at the second access point, particularly in those cases where it is likely that considerable soil or other debris will be forced out of annular cavity 46 by the advance of the grout.

Because of the low injection pressures are made possible by the present invention, the steps described above are carried out with the interior of the liner pipe maintained at substantially atmospheric pressure, without fear of collapsing the liner. In other words, with the present invention it is unnecessary to pressurize the interior of the liner pipe to reduce the possibility of collapse. It will be understood that in some cases the flow (of water, sewage, etc.) which may be backed up within the liner to prevent it from floating may also develop a slight (e.g., 1–2 psi) head pressure due to the partial filling of manholes or other access points, or simply due to the gradient of the conduit; for purposes of this description and the appended claims, however, it will be understood that the term "substantially atmospheric pressure" includes such relatively incidental increases in the interior pressure of the liner which may occur due to damming, backing up, diversion, and so forth of the flow.

With further reference to FIG. 2, the pumpable cement grout 62 of the present invention will now be described in greater detail. Pumpable grout 62 is provided with suitable characteristics (e.g., fluidity) which permit it to be injected into a relatively confined annular space under minimal pressures, so as to avoid generating pressures which would collapse the liner pipe. Of course, the grout needs to retain these characteristics while it proceeds through the entire length of the sewer line between the first and second access points, or else excessive injection pressures may develop. For example, as the leading edge 64 of the grout advances along sewer line 40 as shown in FIG. 2, that portion of the grout which is proximate the leading edge will be hydrating (i.e., setting up), which hydration may be accelerated if the interior surface of sewer pipe 42 and/or the exterior surface of liner pipe 44 are dry, or if the sewer pipe is warm because of warm sewer water flowing through it; nevertheless, despite this hydration, grout 62 needs to remain sufficiently fluid until leading edge 64 reaches the second access point, so as to avoid developing excessive injection pressures. On the other hand, however, grout 62 must also be capable of setting up (i.e., solidifying) so as to form the solid cellular concrete matrix before the bubble structure of the foamed cement grout collapses or dissipates. In short, the pumpable cement grout must be fluid enough to be pumped into the annular cavity under low pressure, yet still be able to set up without excessive delay.

The pumpable cement grout of the present invention achieves these desired characteristics. First, the grout has an initial consistency which is very thin and "runny", so that it may be injected under very low pressures; the initial consistency of the grout of the present invention is somewhat similar to that of cream. This consistency is achieved in part by mixing water with the cement in the slurry mixer in an amount sufficient so that the water-to-cement ratio of the grout is a relatively high 0.60–1.00 by weight; in other words, the weight of the water in a given amount of the grout is from about 0.60 to about 1.00 times the weight of the cement in that amount of the grout. This is a significantly higher water-to-cement ratio than that utilized in other foamed cement mixes, such as conventional roof deck-type cellular concrete mixes, and consequently provides the grout of the present invention with a much thinner and more easily pumpable consistency.

The pregenerated aqueous foam is mixed with this water-to-cement mixture in an amount sufficient to adjust the wet density of the grout to a value of from about 48 to 72 pounds per cubic foot. In some applications, it may be desirable to adjust the wet density of the grout upwardly to a value of about 75 pounds per cubic foot. For use in grouting liners in sewer lines, it has usually been found preferable to use sufficient foam to adjust the wet density of the grout to a value of from about 55 to about 62.4 pounds per cubic foot: within this particular range, the density of the grout is generally less than that of the sewer water being carried through the sewer liner (this typically having a density of about 62.4 PCF), thus preventing the sewer liner from floating on the grout during the grouting operation. This is important in order to preserve the annular gap along the top of the liner pipe, so that this can be filled by the grout which will subsequently protect the top of the liner. Such relatively low densities are also important in achieving low injection pressures, particularly if it is necessary to inject against a head pressure, which occurs when the pipe is inclined upwardly and injection is being conducted at a relatively low point along the pipe.

As described, the pumpable cement grout of the present invention has a wet density of from about 48 PCF to about 72 PCF. Lightweight roof deck-type cellular concrete mixes have even lower densities, which may typically range from 20 to 45 pounds per cubic foot; however, as previously noted, the water-to-cement ratio of such typical roof deck type mixes is typically about 0.50 (as opposed to 0.68 to 1.00 in the grout of the present invention), rendering such roof deck-type mixes much thicker and more difficult to pump. However, a thin or runny consistency is not desired for roof deck applications, because the roof deck is typically constructed to have a certain pitch, and it is undesirable for the mix to run down the pitched roof. Roof deck-type cellular concrete mixes consequently have a consistency similar to that of whipped cream or meringue, and if an attempt were made to pump such a mix through the annular cavity between a sewer pipe and a plastic liner, excessive friction would result from the thick, viscous consistency of the mixture, resulting in higher injection pressures and probable collapse of the liner pipe. Furthermore, some such typical mixes contain sand or other mineral aggregate material, which would create still more friction and pressure.

While the grout of the present invention will therefore generally be free of mineral aggregate material for most applications, it may be desirable in some applications replace a portion of the cement in the grout with fly ash in order to achieve cost savings, while still maintaining the desired density and fluidity of the grout. Fly ash, as is well known to those skilled in the art, is a finely divided residue that results from the combustion of pulverized coal, during which mineral impurities (e.g., clay, feldspar, quartz, and shale) fuse and form spherical particles; fly ash is inexpensive, and generally no processing is needed for using it in blended cement. Sand may also be included in relatively small amounts, for example, on the order of 1,000 lbs./yd.$^3$ in some applications, provided that the density of the grout remains within acceptable ranges and the abrasiveness of the sand does not cause the development of excessive back pressure for the particular job.

Furthermore, it may be desirable in some applications to add superplasticizers to the grout, so as to be able to reduce the amount of water used in the grout while maintaining its fluid consistency. As is known to those skilled in the art, superplasticizers are high range water reducers which are added to concrete (often to concrete having a low-to-normal slump and water-to-cement ratio) in order to make high-slump, flowing concrete. Examples of such superplasticizer chemicals which are compatible with the preformed aqueous foam in the grout of the present invention include those available under the trademark "Mighty 150" from Boremco, Specialties Chemical Division, P.O. Box 02573, Fall River, Me. 02722, and under the trademark "WRDA 19" from W. R. Grace and Company, Derex Division, 62 Wittemore Avenue, Cambridge, Mass. 02140. Such superplasticizer chemicals may be lignum-based products, and, as is known to those skilled in the art, act as a cement dispersant which releases particles of cement which surround water particles in ordinary cement or concrete mixes. Superplasticizer chemicals may be desirable because they permit the use of a lower water-to-cement ratio, thus creating higher strength in the hardened cement, without a corresponding reduction in fluidity. For example, beginning with an exemplary pumpable cement grout mix in accordance with the present invention, which calls for 1093.85 lbs./yd.$^3$ cement, 743.14 lbs./yd.$^3$ water, and 22.76 lbs/yd.$^3$ foam, a reduction of about 100 pounds of water per cubic yard of mix may be achieved by adding about 10 ounces of typical superplasticizer chemical per 100 pounds of cement in the mix. A range of from about 6 ounces of superplasticizer per 100 pounds cement (which achieves a 60 lbs./yd.$^3$ water reduction) to about 20 ounces of superplasticizer chemical per 100 pounds of cement (which achieves about a 100 lbs./yd.$^3$ water reduction) may be used in the grout of the present invention; using superplasticizer chemical in amounts in excess of 20 ounces per 100 pounds of cement may result in undesirable reduction in stability of the bubble structure of the grout.

Another additive which may be highly desirable for many applications of the present invention is bentonite, which serves to inhibit extraneous water in the annular space from contaminating the grout by absorption. This may be particularly critical matter if the old sewer pipe is badly deteriorated and significant amounts of water are flowing from the surrounding earth into the sewer pipe through fissures or holes in its wall. Incorporating bentonite in the pumpable cement grout of the present invention may also help control bleeding of water from the grout, particularly when the grout is being injected against relatively high head pressures. Bentonite itself is a soft, porous, moisture absorbing pulverized rock material, comprising generally a colloidal native hydrated aluminum silicate (clay), and has the property of forming gels or viscous suspensions in combination with water. When desired, it has been found useful to add bentonite to the grout of the present invention in amounts of about 5–10 pounds per cubic yard.

Having described the grout of the present invention and a method for its use, the results of two field tests will now be described.

In the first field test, a 14 inch outside diameter HDPE pipe was jacked into an existing 15 inch inside diameter concrete pipe over distances greater than 300 feet. The small clearances involved in this case (only a 1-inch difference in diameters) made it impossible to block the new liner in position. Thus, in order to insure that the new liner was encased in the protective grout, it was necessary to prevent it from floating on the grout to the top of the sewer line; the HDPE liner was consequently filled with sewage having a density of about 62.5 pounds per cubic foot, and the grout was mixed to have a wet density of about 62 pounds per cubic foot.

A total of 5000 linear feet of the jacked-in HDPE liner pipe were backfilled with the grout. The grout was pumped downstream so as to minimize pressure on the pipe. In order to provide the required protection for the HDPE pipe liner, the compressive strength of the set grout needed to exceed 200 psi; once set, the grout installed in this field test developed compressive strengths exceeding 300 psi. Video cameras used to inspect the rehabilitated sewer after completion of the grouting operation detected no distortion in the HDPE liner pipe.

A second field test was conducted to grout an 18 inch outside diameter HDPE liner pipe which had been jacked into a 20 inch inside diameter concrete pipe over distances greater than 500 feet. A total of 4900 linear feet of HDPE liner pipe were backfilled, using grout mixed to have a wet density of 50 pounds per cubic foot. A major problem in this particular project was that it was impractical to stop the flow of the sewer while the liner was being grouted. Accordingly, in order to prevent the liner from floating on the grout, a plug containing holes for regulating the flow of sewage was installed in the downstream end of the liner. Using this system, the flow of sewage was maintained, but enough sewage was backed up to keep the section of liner full while it was being grouted. Careful monitoring of a backup bypass system prevented the sewer from overflowing through upstream manholes.

The grout was then injected in the manner previously described, with the pump output being carefully controlled so that the grout injection pressure did not exceed 2 psi. The vent at the downstream end was plugged when the undiluted grout appeared at the downstream bulkhead. The rapid set time of the grout allowed full sewer flow to be restored in less than six hours. Video inspection after completion of the grouting detected no deformation of the new liner.

In both of these projects, all grouting took place between manholes, so no excavation or drilling along the sewer line was required. Grout injection was monitored visually to insure that annular voids were completely filled and all water was displaced from the annular space between the old pipe and the new liner.

The proportions of the components of the grout may be adjusted to provide either higher or lower densities, as may be desired for a particular project. For example, during the first field test described above, batches of grout mixes were tested having unit weights ranging from 59.96 to 69.86 pounds per cubic foot. The compressive strength of the grout typically varies with its density, and so this can be adjusted (while still maintaining an acceptable level of fluidity) by varying the amount of foam injected into the grout within an acceptable range. For example, a grout backfill in accordance with the present invention, having a density of approximately 51 pounds per cubic foot, had an average 28 day compressive strength of 580 psi; for a ten percent increase in density to approximately 56 pounds per cubic foot, the average 28 day compressive strength increased 50 percent to 885 psi. One skilled in the art can adjust the proportions of cement, water, and pregenerated foam, within the ranges prescribed herein, to produce an acceptable grout having a density between about 48 and about 75 pounds per cubic foot. Two exemplary mixtures in accordance with the present invention, each having a different density, are provided by the following tables:

TABLE 1

| MATERIALS | WT., LBS. | VOLUME, CF. | UNIT WT., PCF |
|---|---|---|---|
| Cement | 1093 | 3.23 | |
| Water | 634 | 10.16 | |
| | 1727 | 13.39 | 128.98 |
| Foam | 33 | 13.71 | |
| | 1760 | 27.10 | 64.94 |

TABLE 2

| MATERIALS | WT., LBS. | VOLUME, CF. | UNIT WT., PCF |
|---|---|---|---|
| Cement | 950 | 4.83 | |
| Water | 645 | 10.34 | |
| | 1595 | 15.17 | 105.14 |
| Foam | 28 | 11.83 | |
| | 1623 | 27.00 | 60.11 |

The exemplary grout mixes set forth above have been found satisfactory for use in a number of applications. However, as was briefly noted above, there are a number of factors which may be present in a grouting job which tend to make it more difficult than usual to maintain the fluidity of the grout as it is pumped longitudinally through the annular cavity: not only may the warmth of the environment and the dryness of the pipe and liner hasten hydration of the grout, but resistance to the grout injection may be very significantly increased if the exterior of the liner pipe is ribbed or corrugated. An example of a liner pipe having such an exterior is "Spirolite"™ HDPE pipe which is available from Chevron Plexco, 14381 Lear Blvd., Reno, Nev. 89506. The Spirolite™ piping is manufactured with a spiral external corrugation which gives it relatively greater rigidity for its weight, but this corrugation also naturally impedes the flow of grout longitudinally through the annular cavity between the liner and the pipe in which it is installed. To illustrate this, FIG. 3 shows a length of sewer pipe 80 in which a spirally corrugated liner pipe 82 has been installed, so as to form an annular cavity 84. The fluid grout 86 of the present invention is injected longitudinally through this cavity in the manner previously described (from the left in FIG. 3), and this flows longitudinally through the cavity generally in the direction indicated by arrows 88, 89, behind a leading edge 90. The multiplicity of spiral corrugations 92 extend into the annular cavity 84 more-or-less perpendicularly to the flow path of the grout indicated by arrows 88 and 89, and so these corrugations tend to impede the flow of the grout in a longitudinal direction through the cavity, particularly if the grout is relatively thick and viscous; the resulting resistance thus tends to increase the injection pressure.

It has been discovered that the difficulties thus encountered when attempting to grout externally corrugated liner pipe such as Spirolite™ can be overcome using the grout of the present invention, specifically, by using a grout mix similar to those discussed above but having an increased water-to-cement ratio, so that the mix is significantly more fluid and thus more easily pumped through an annular cavity against the resistance offered by the corrugations or ribs.

Furthermore, the higher water-to-cement ratio offsets the absorption (i.e., water loss from the fluid grout) which is experienced due to the much greater external surface area of spirally corrugated pipe such as Spirolite™. Consequently, it has been found that foamed, pumpable cement grouts in accordance with the present invention having a water-to-cement ratio in the range of about 0.80 (or less) to about 1.00 are eminently suitable for these applications. The following tables illustrate two such grout mixes, both of these having a water-to-cement ratio of 1.00:

TABLE 3

| MATERIALS | WT., LBS. | VOLUME, CF. | UNIT WT., PCF |
|---|---|---|---|
| Cement | 932 | 4.74 | |
| Water | 932 | 14.94 | |
| | 1864 | 19.68 | 94.72 |
| Foam | 18 | 7.50 | |
| | 1882 | 27.18 | 69.24 |

TABLE 4

| MATERIALS | WT., LBS. | VOLUME, CF. | UNIT WT., PCF |
|---|---|---|---|
| Cement | 649 | 3.30 | |
| Water | 649 | 10.40 | |
| | 1298 | 13.70 | 94.74 |
| Foam | 32 | 13.33 | |
| | 1330 | 27.03 | 49.20 |

The range of suitable unit weights for grouts having water-to-cement ratios in this range (about 0.80–1.00) has been found to extend from about 48 PCF to about 70 PCF. As with the other grout mixes described above, a number of substitutions or additives can be made in the grout mixes having these higher water-to-cement ratios. In particular, fly ash can readily be substituted for cement in these mixes, being that it gives a very fluid grout mixture, but it must be kept in mind that a decrease in compressive strength may be encountered when using increased levels of fly ash in the composition. Also, superplasticizing agent may be optionally used in these mixes, preferably in the range of about 6–12 ounces per hundred weight of cement. Still further, these compositions can benefit greatly from the addition of bentonite in many applications, being that it minimizes the bleeding of water from the grout. It should also be recognized that, although the grout mixes having water-to-cement ratios in the range of 0.80–1.00 are most notably suitable for use with externally ribbed pipe liners, they may also be used with smooth-sided (i.e., non-corrugated) liners in some applications.

Figure 4:
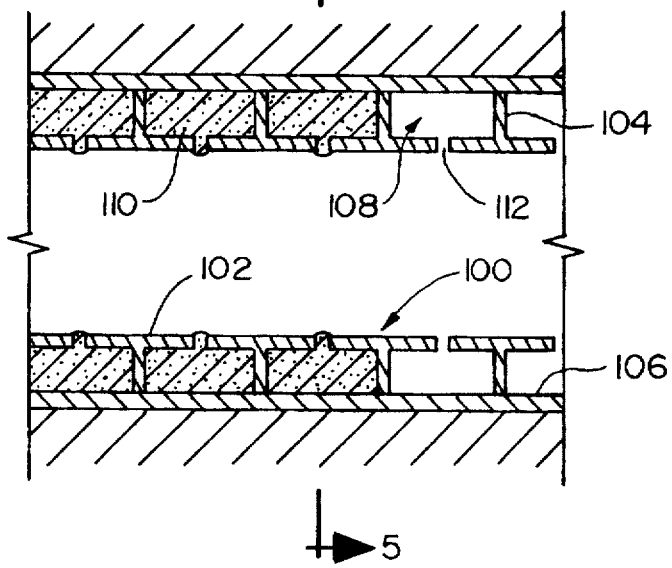
FIG. 4 is a longitudinal cross-sectional view of a length of concrete conduit having a type of liner pipe installed therein in which there are support flanges which extend radially from the liner pipe to engage the inner surface of the conduit, thus forming annular cavities which are filled with grout to complete the installation.
Figure 5:
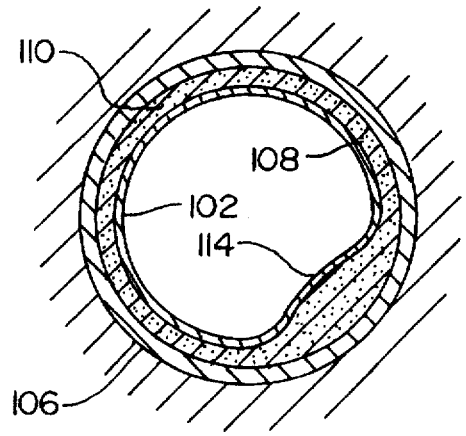
FIG. 5 is cross-sectional view taken along line 5—5 in FIG. 4, showing the development of an inward collapse or "blister" of the liner when using heavy grout materials to fill the annular cavities in accordance with prior art techniques.

The mixes of the present invention also provide a light-weight cellular grout which is eminently suited to use for filling the annular cavities 108 of the "T-LOCK"-type liner system, as shown in FIG. 4. Because the material is both highly fluid and light in weight, the problem of excessive pressures developing against the lower sidewalls and bottom of the liner pipe is obviated. In this case, the grout flows through an elongate, curved path from the injection points, and circumferentially or annularly along the exterior of the liner pipe, rather than in a direction parallel to the long axis of the conduit/liner, i.e., the flow is generally in the direction of the curved axis of the cavity or chamber 108.

In using the grout mixes and techniques described above, a number of more general factors have also been found important in achieving successful grouting of HDPE sewer pipe liners:

a) injection pressure should be closely monitored and carefully controlled by regulating the velocity and viscosity of the grout.

b) densities should be checked on every batch both before and after foaming to insure that the grout was properly batched.

c) variations and batched density should be corrected by adding water, foam, or both.

d) no batch older than two hours should be used on a long run.

e) pressure monitoring equipment should be carefully calibrated.

Properly trained personnel and quality control of the cellular foam concrete grout have also been found to be important factors in successful grouting of sewer pipe liners.

The foregoing description has focussed largely on the exemplary application of the present invention to the grouting of HDPE pipe liners; however, it should be understood that the grout mixes and grouting methods of the present invention may be used to grout a wide variety of void spaces in addition to those discussed. For example, these may be used to grout the annular space between the wire bundle and sheath pipe in bridge cable assemblies. It is thus to be recognized that these and various other modifications may be made to the illustrative embodiments described herein without departing from the spirit and scope of the present invention, and so the invention is not to be limited except as by the appended claims.

What is claimed and desired to be secured by Letters Patent of the United States is:

1. A method for lining a conduit, said method comprising the steps of:

placing a liner in said conduit so that at least one cavity is formed intermediate said conduit and said liner, an interior of said liner being maintained substantially unpressurized, and said liner having a tendency to collapse if subjected to an external pressure in excess of a predetermined maximum pressure;

forming a pumpable cement grout, said grout comprising:
hydraulic cement;
water in an amount sufficient so that the water-to-cement ratio of said grout is from about 0.60 to about 1.00 by weight; and
pre-generated aqueous foam in an amount sufficient to adjust the wet density of said grout to a value of from about 48 to about 72 pounds per cubic foot;

pumping said cement grout into said cavity under positive pressure, so that said grout fills said cavity by flowing in a direction generally along an axis of said cavity; and maintaining said positive pressure under which said cement grout is pumped into said cavity intermediate said conduit and liner at about equal to or less than said predetermined maximum pressure.

2. The method of claim 1, wherein the step of forming said pumpable cement grout further comprises:

determining the density of said liner; and mixing said pre-generated aqueous foam into said grout in an amount sufficient to adjust said density of said grout to a value substantially equal to or less than said density of said liner so as to avoid said liner floating on said grout to the top of the interior of said conduit.

3. The method of claim 2, further comprising the step of directing a flow of fluid through said liner, and wherein the step of determining the density of said liner comprises determining the density of said liner carrying said flow of said fluid.

4. The method of claim 3, wherein the step of directing said flow of fluid through said liner further comprises backing said flow of fluid up into said liner, so that said density of said liner is increased, so as to permit said density of said grout to be increased and still remain equal to or less than said density of said liner.

5. The method of claim 4, wherein the step of backing said flow of fluid up into said liner further comprises the step of backing said flow of fluid up so as to substantially fill said liner with said fluid.

6. The method of claim 1, wherein the step of placing a liner in said conduit comprises:

placing a tubular liner in said conduit so that a generally annular cavity is formed intermediate said conduit liner.

7. The method of claim 6, wherein the step of placing said tubular liner in said conduit comprises:

placing a tubular liner in said conduit which has an internal diameter equal to or less than about 60 inches, so that access to said interior of said liner is available at least one manhole located along a length of said liner.

8. The method of claim 6, wherein the step of placing said tubular liner in said conduit comprises:

placing a tubular liner in said conduit which has an internal diameter equal to or greater than about 60 inches, so that access to said interior of said liner is available through a bore of said liner.

9. The method of claim 6, wherein the step of placing said tubular liner in said conduit comprises:

placing a tubular liner in said conduit which has a generally continuous cylindrical outer surface, so that a substantially continuous annular cavity is formed along a length of said liner.

10. The method of claim 9, wherein the step of pumping said grout into said cavity comprises:

pumping said grout into said substantially continuous annular cavity so that said grout fills said cavity by flowing in a direction generally along a longitudinal axis of said liner.

11. The method of claim 6, wherein the step of placing said tubular liner in said conduit comprises:

placing a tubular liner in said conduit which has a plurality of longitudinally-spaced, radially extending support members formed on an exterior thereof, so that said support members engage an interior surface of said conduit and form a plurality of individual cavities which extend annularly about said liner.

12. The method of claim 11, wherein the step of pumping said grout into said cavity comprises:

pumping said grout into each of said annularly-extending cavities so that said grout flows therein in a direction generally along a curved axis of said cavity which extends circumferentially about said liner.

13. The method of claim 12, wherein the step of forming said grout further comprises:

forming said grout with said pre-generated aqueous foam in an amount which is sufficient to reduce said weight density of said grout to a density at which a weight of said grout filling said annular cavity is insufficient to cause a pressure exceeding said maximum pressure to be exerted against bottom portions of said liner.

14. The method of claim 1, wherein the step of forming said grout further comprises:

forming said pumpable cement grout with fly ash present in a predetermined amount.

15. A method of lining a pipe, said pipe having a longitudinal extent and a predetermined internal diameter, said pipe further having access to the interior thereof from the surface at first and second longitudinally spaced-apart access manholes, said method comprising:

placing a tubular liner in said pipe, said liner having an external diameter such that an annular cavity is formed intermediate said pipe and said liner, an interior of said liner being maintained at substantially atmospheric pressure and said liner further having a tendency to collapse if subjected to an external pressure which is in excess of a maximum pressure which exceeds atmospheric pressure by a predetermined amount;

forming a pumpable cement grout, said grout comprising: hydraulic cement;

water in an amount sufficient so that the water-to-cement ratio of said grout is from about 0.60 to about 1.00 by weight; and pre-generated aqueous foam in an amount sufficient to adjust the wet density of said grout to a value of from about 48 to about 72 pounds per cubic foot;

pumping said cement grout under positive pressure into said annular cavity so that said grout fills said annular cavity by flowing in a generally longitudinal direction through said pipe from said first access manhole towards said second access manhole, said pressure under which said cement grout is pumped into said annular cavity being maintained about equal to or less than said maximum pressure; and terminating said pumping of said cement grout into said annular cavity when said flow of said grout through said pipe reaches said second access manhole.

16. The method of claim 15, wherein the step of forming said pumpable cement grout comprises:

determining the density of said liner; and mixing said pre-generated aqueous foam into said grout in an amount which is sufficient to adjust said wet density of said grout to a density which is substantially equal to or less than that of said liner, so as to avoid said liner floating on said grout to the top of the interior of said pipe.

17. The method of claim 16, further comprising the step of directing a flow of fluid through said liner, and wherein the step of determining the density of said liner comprises determining the density of said liner carrying said flow of said fluid.

18. The method of claim 17, wherein the step of directing said flow of fluid through said liner further comprises backing said flow of fluid up into said liner, so that said density of said liner is increased, so as to permit said density of said grout to be increased and still remain equal to or less than said density of said liner.

19. The method of claim 18 wherein the step of backing said flow of fluid up into said liner further comprises:

backing said flow of fluid up into said liner so that said liner is substantially filled by said fluid.

20. The method of claim 19 wherein the step of backing said flow of fluid up into said liner further comprises:

backing said flow of fluid up into said liner so that said access manholes are at least partially filled upwardly thereby, so as to ensure complete filling of said liner.

21. The method of claim 1, wherein the step of placing said tubular liner in said conduit comprises:

placing a tubular liner in said conduit which has an internal diameter equal to or less than about 60 inches, so that access to said interior of said liner is available at least one manhole located along a length of said liner, said liner being sized so that a radial clearance of about 3 inches or less is formed between said liner and said conduit.

22. A method for lining a conduit, said method comprising the steps of:

placing a tubular liner in said conduit so that at least one cavity is formed intermediate said conduit and said liner, an interior of said liner being maintained substantially unpressurized and said liner having a tendency to collapse if subjected to an external pressure in excess of a predetermined maximum pressure, said conduit having an internal diameter equal to or less than about 60 inches so that access to said interior of said liner is available at least one manhole located along a length of said liner, and said liner being sized so that a radial clearance of about 3 inches or less is formed between said liner and said conduit;

forming a pumpable cement grout, said grout comprising:
hydraulic cement;
water in an amount sufficient so that the water-to-cement ratio of said grout is from about 0.60 to about 1.00 by weight; and
pre-generated aqueous foam in an amount sufficient to adjust the wet density of said grout to a value of from about 48 to about 72 pounds per cubic foot;

pumping said cement grout into said cavity under positive pressure, so that said grout fills said cavity by flowing in a direction generally along an axis of said cavity; and maintaining said positive pressure under which said cement grout is pumped into said cavity intermediate said conduit and liner at about equal to or less than said predetermined pressure.

* * * * *